United States Patent [19]

Raffles et al.

[11] Patent Number: 5,476,395
[45] Date of Patent: Dec. 19, 1995

[54] PLANAR FUSE PANEL

[75] Inventors: Scott J. Raffles, Queen Creek; Van H. Potter; Joseph V. Woodley, both of Scottsdale; Robert B. Haines, Mesa, all of Ariz.

[73] Assignee: Methode Electronics, Inc., Chicago, Ill.

[21] Appl. No.: 202,967

[22] Filed: Feb. 28, 1994

Related U.S. Application Data

[63] Continuation-in-part of Ser. No. 25,043, Mar. 1, 1993, Pat. No. 5,306,181.

[51] Int. Cl.$^6$ .................................................. H01R 33/95
[52] U.S. Cl. ............................ 439/621; 361/813; 439/55
[58] Field of Search .................................. 361/813, 833, 361/837; 257/666, 667, 676; 439/621, 622, 55

[56] References Cited

U.S. PATENT DOCUMENTS

| | | | |
|---|---|---|---|
| D. 321,683 | 11/1991 | Marach | D13/173 |
| 2,116,269 | 5/1938 | Kobzy | 29/874 |
| 3,140,364 | 7/1964 | Swanke et al. | 200/11 K |
| 3,457,640 | 7/1969 | Rayburn | 29/884 |
| 3,618,207 | 11/1971 | Sand et al. | 29/882 |
| 4,197,636 | 4/1980 | Osanai | 29/882 |
| 4,214,801 | 7/1980 | Cairns et al. . | |
| 4,221,455 | 9/1980 | Cairns et al. . | |
| 4,221,456 | 9/1980 | Cairns et al. . | |
| 4,226,493 | 10/1980 | Cairns et al. . | |
| 4,227,761 | 10/1980 | Cairns et al. . | |
| 4,238,140 | 12/1980 | Cairns et al. . | |
| 4,337,574 | 7/1982 | Hughes et al. | 29/883 |
| 4,355,853 | 10/1982 | Kourimsky . | |
| 4,599,679 | 7/1986 | Baader . | |
| 4,616,416 | 10/1986 | Cabaud | 29/884 |
| 4,689,718 | 8/1987 | Maue et al. . | |
| 4,703,397 | 10/1987 | Minoura et al. . | |
| 4,712,299 | 12/1987 | Loewen et al. | 29/882 |
| 4,772,701 | 2/1988 | Bradt | 439/718 |
| 4,781,600 | 11/1988 | Sugiyama et al. | 439/45 |
| 4,781,621 | 11/1988 | Sugiyama et al. | 439/559 |
| 4,799,893 | 1/1989 | Ogawa et al. | 439/76 |
| 4,801,278 | 1/1989 | Sappington | 439/746 |
| 4,846,733 | 7/1989 | Baisz et al. | 439/622 |
| 4,850,884 | 7/1989 | Sawai et al. | 439/76 |
| 4,869,675 | 9/1989 | Ogawa | 439/76 |
| 4,872,262 | 10/1989 | Marach | 29/884 |
| 4,938,715 | 7/1990 | Jones et al. | 439/621 |
| 4,944,691 | 7/1990 | Marach | 439/621 |
| 4,972,295 | 11/1990 | Suguro et al. . | |
| 5,073,131 | 12/1991 | Levine | 439/621 |
| 5,113,168 | 5/1992 | Lindquist | 337/187 |
| 5,171,293 | 12/1992 | Umemoto et al. | 439/622 |
| 5,179,503 | 1/1993 | Fouts et al. . | |
| 5,207,591 | 5/1993 | Ozaki et al. | 439/212 |
| 5,215,479 | 6/1993 | Araki et al. | 439/622 |
| 5,229,922 | 7/1993 | Muramatsu et al. . | |
| 5,285,011 | 2/1994 | Shimochi | 439/621 |

FOREIGN PATENT DOCUMENTS

0339846A2  4/1989  European Pat. Off. .

*Primary Examiner*—Gary F. Paumer
*Attorney, Agent, or Firm*—David L. Newman

[57] ABSTRACT

A planar fuse panel is presented. In accordance with the present invention, a section of conductive metal of the desired thickness, temper and shape is stamped out from a sheet of conductive metal. Simultaneously, a fuse holding spring mechanism or bent tabs, or blade terminals are formed in the same stamping operation for frictionally engaging fuses or other electrical connectors. The fuse panel includes a plurality of male blade connectors of a known configuration extending from the edges as well as other locations on the fuse panel to accept a variety of I/O configurations. A multiplicity of circuits may be included in the planar fuse panel (in a multilayer fashion) depending on the number of circuits desired. The circuits may have any suitable planar shape. Also described is a spring clip for use with the various fuseplanes.

14 Claims, 8 Drawing Sheets

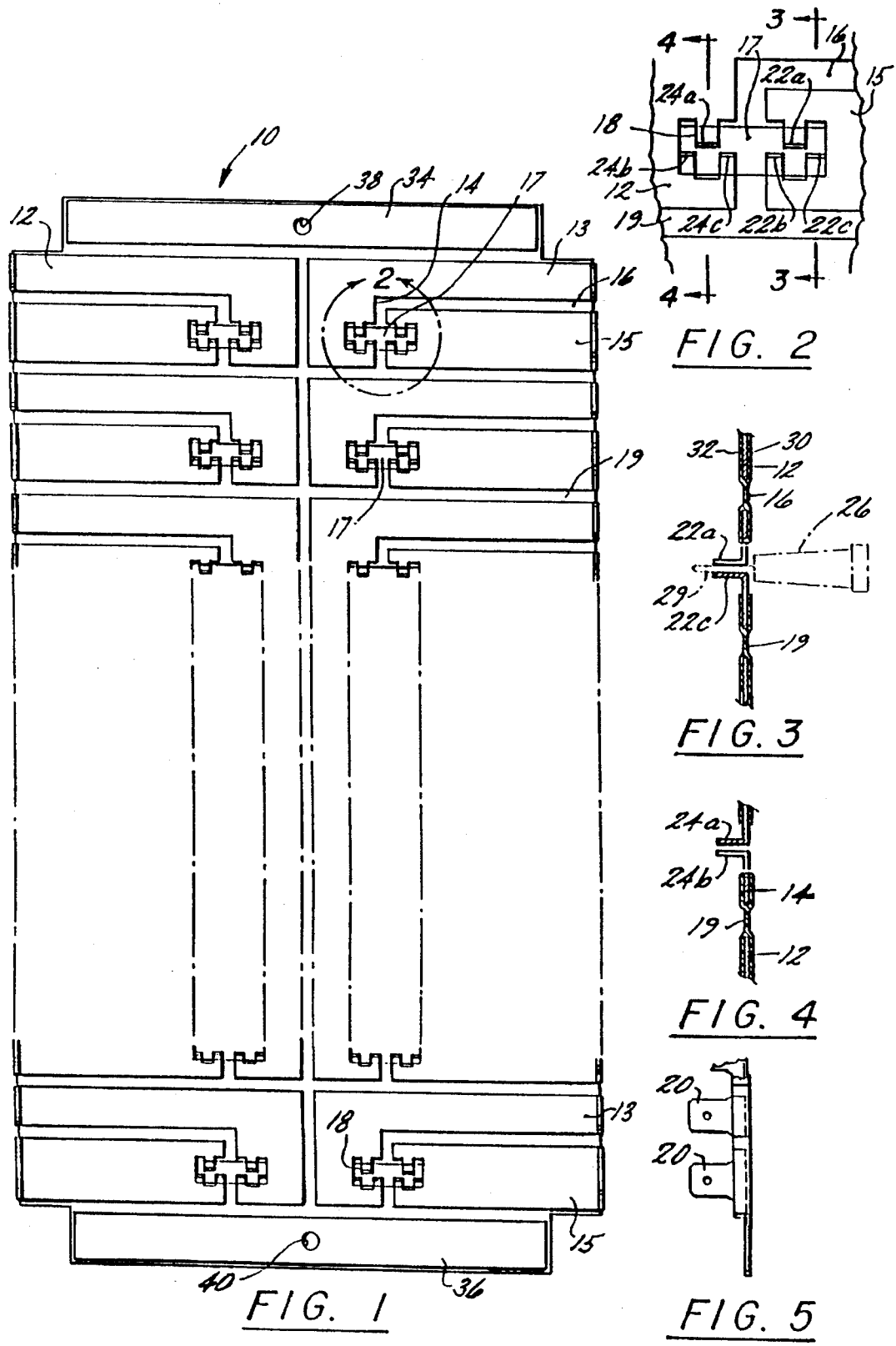

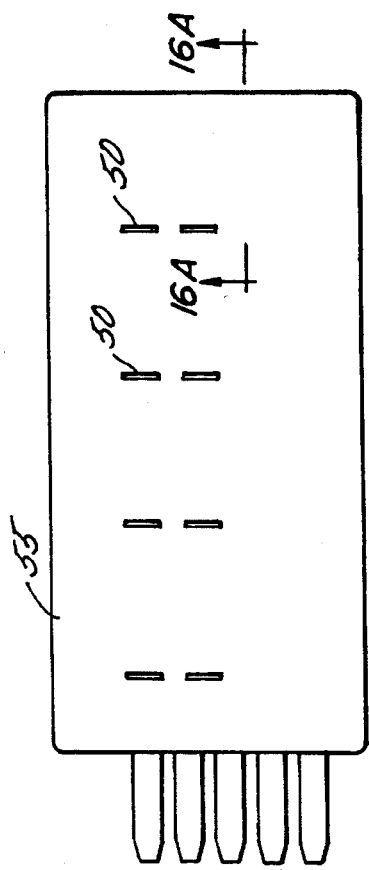
FIG. 16
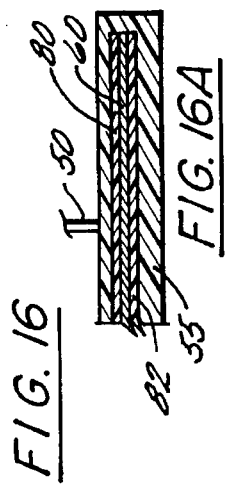
FIG. 16A
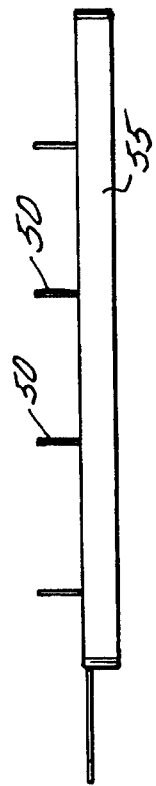
FIG. 18
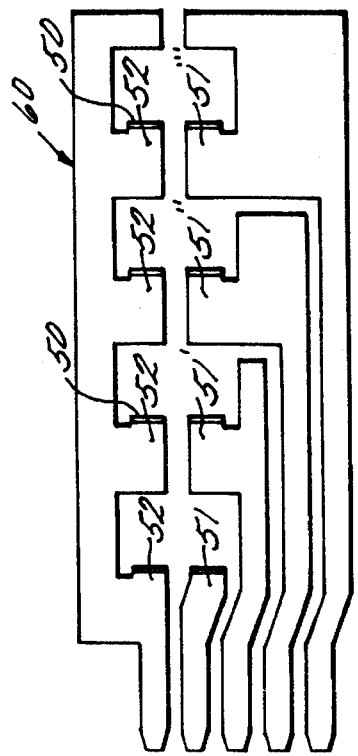
FIG. 15
FIG. 17

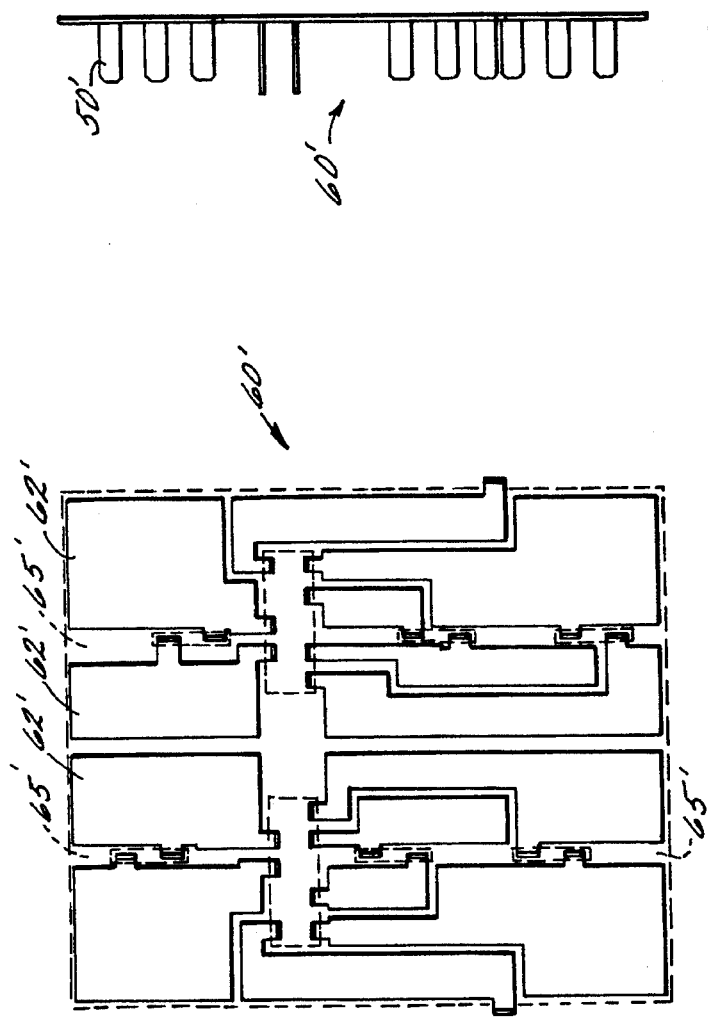
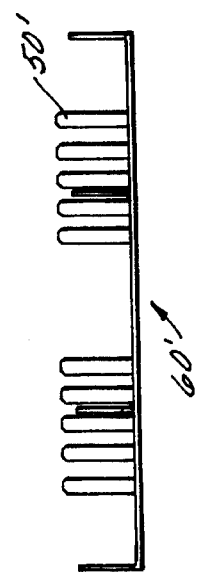
FIG. 20A
FIG. 20
FIG. 20B

PLANAR FUSE PANEL

CROSS-REFERENCE TO RELATED APPLICATION

This application is a continuation-in-part of U.S. application Ser. No. 08/025,043 filed Mar. 1, 1993, now U.S. Pat. No. 5,306,181.

BACKGROUND OF THE INVENTION

The present invention relates generally to fuse holders for replaceable electrical circuit elements such as fuses and the like. More particularly, this invention relates to a novel one piece planar fuse holder that may be directly retained by the connecting power distribution circuitry which eliminates the need for separable discrete fuse holders in the circuitry. This invention is particularly well suited for use in motor vehicle applications, electronic packaging applications and any other applications where blade-type connections are required.

There are several prior art fuse holders that incorporate stamping and forming methods to mass produce contact terminals. This prior art is exemplified by U.S. Pat. Nos. 4,616,416 to and 4,712,299 to Loewen et al. However, both of these patents apply only to the metal terminal elements of fuse holders or other electrical connectors.

Prior art U.S. Pat. No. 4,872,262 to David R. March does address the need for a fuse holder for replaceable circuit elements having blade-type terminals. Such fuses are well known in the industry and comprise a pair of spaced blades partially enclosed in an insulative housing. The blades are interconnected within the housing by a conductive interconnect which self-destructs at a preselected amperage. The blades extend from the housing for frictional connection to a suitable, typically plastic housing. Examples of such fuses include "ATC" fuses manufactured by Cooper Industries, Inc. of Houston, Tex. and "ATO" fuses manufactured by Littelfuse. Blade-type fuses have found widespread use in electrical systems found in automobiles, motorboats and many other products.

The disclosure of U.S. Pat. No. 4,872,262 does show improvements and economies over prior art. However, U.S. Pat. No. 4,872,262 still suffers from certain drawbacks such as requiring a multiplicity of parts as well as requiring separate fuse holder blocks for separate circuits. Other patents of interest in this area, which pose similar or other problems, include U.S. Pat. Nos. 2,116,269; 3,140,364; 3,457,640; 3,618,207; 4,197,636; 4,337,574; 4,801,278; 4,938,715 and 5,113.168.

SUMMARY OF THE INVENTION

The above-discussed and other drawbacks and deficiencies of the prior art are overcome or alleviated by the planar fuse panel of the present invention. In accordance with the present invention, a section of conductive metal of the desired thickness, temper and shape is stamped out from a sheet of conductive metal. Simultaneously, a fuse holding spring or bent tabs are formed in the same stamping operation for frictionally engaging blades from blade-type fuses. The edges of the fuse panel include a plurality of male blade connectors of a known configuration. A multiplicity of circuits may be included in the planar fuse panel depending on the number of circuits desired. The circuits may have any suitable planar shape. In a preferred embodiment, each circuit has an overall rectangular shape with a first portion consisting of an "L" shaped element and a second portion comprising a rectangular shaped element located in the shoulder of the first element. Spaces are formed bridging the two portions of each circuit with bent tabs extending into each space to frictionally engage a blade-type terminal from a fuse or the like. The conductive metal is appropriately finished and/or plated and then insulative layers, such as polyester or polyamide film, are applied (e.g., laminated) to both surfaces of the metal in sheet form.

In an alternative embodiment, the fuse panel may include two metal layers with a first layer acting as the current carrying medium and a second layer having greater resiliency to normally maintain the second layer in contact with the first layer. In another alternative embodiment, bent tabs are replaced by blade terminals, one extending from each element of each circuit.

In another embodiment, the bent tabs and gaps are replaced by blade terminals so that a simplified process of thermoplastic molding can be used to insulate the fuseplane.

It is also disclosed herein that multilayer fuseplanes can be constructed which allow for higher current density and/or larger numbers of circuits in substantially equivalent space. Carefully selected configurations of elements and spaces therebetween cooperate to nest the multiple layers together.

In accordance with an important feature of this invention, discrete connector means provide direct electrical and mechanical contact between a tab (or blade) extending from the fuseplane and a blade extending from a blade-type component. This is in contrast to prior art devices which utilize intermediate connectors for indirect electrical connection between the fuse plane and a blade-type component. In a preferred embodiment, this discrete connector means comprises a spring clip to assist in frictionally engaging two blade terminals. In this way, blade-type fuses can be directly connected to other blade terminals of the fuseplane reliably and effectively.

The present invention exhibits a low profile configuration which eliminates the need for terminal blocks and precludes crimping or soldering operations. Customer configurations can be made quickly and inexpensively and are designed on computerized numerically controlled equipment. An important feature is that the planar fuse panel of the present invention is much more economical to design and produce than prior art holders for blade-type circuit elements such as those fuse holders disclosed in U.S. Pat. No. 4,872,262.

The present invention is thus both simple to design, manufacture and much more inexpensive to produce. The present invention can also readily accommodate other electrical or electronic components such as relays, and the like. Another important feature of the present invention relative to prior art such as disclosed in U.S. Pat. No. 4,872,262, is that each electrical or electronic element or fuse can be positioned on a totally different circuit (e.g., not tied to a common power source as is required in U.S. Pat. No. 4,872,262). In addition, the present invention can use a common power source (if required) with ease or any combination of circuitry as desired.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 1 is a plan view of the preferred embodiment of the planar fuse panel of the present invention;

FIG. 2 is an enlarged detailed plan view of the area encircled as 2 in FIG. 1;

FIG. 3 is a cross-sectional elevation view of the planar fuse panel of FIG. 2 along the line 3—3 of FIG. 2;

FIG. 4 is a cross-sectional elevation view of the planar fuse panel of FIG. 2 along the line 4—4 of FIG. 2:

FIG. 5 is a partial elevated side view of the planar fuse panel of FIG. 1;

FIG. 15 is a top view of an embodiment of the fuseplane where the several circuits utilize a collective element and blade terminals;

FIG. 16 is a top view of FIG. 15 after application of thermoplastic insulative material;

FIG. 16A is a cross-sectional elevation view of an alternative embodiment of the planar fuse plane of FIG. 16;

FIG. 17 is a side view of FIG. 15;

FIG. 18 is a side view of FIG. 16;

FIG. 20 is a plan view of the bottom layer of a multilayer fuseplane;

FIG. 20A is an end view of FIG. 20;

FIG. 20B is a side view of FIG. 20;

DESCRIPTION OF THE PREFERRED EMBODIMENT

Figure 6:
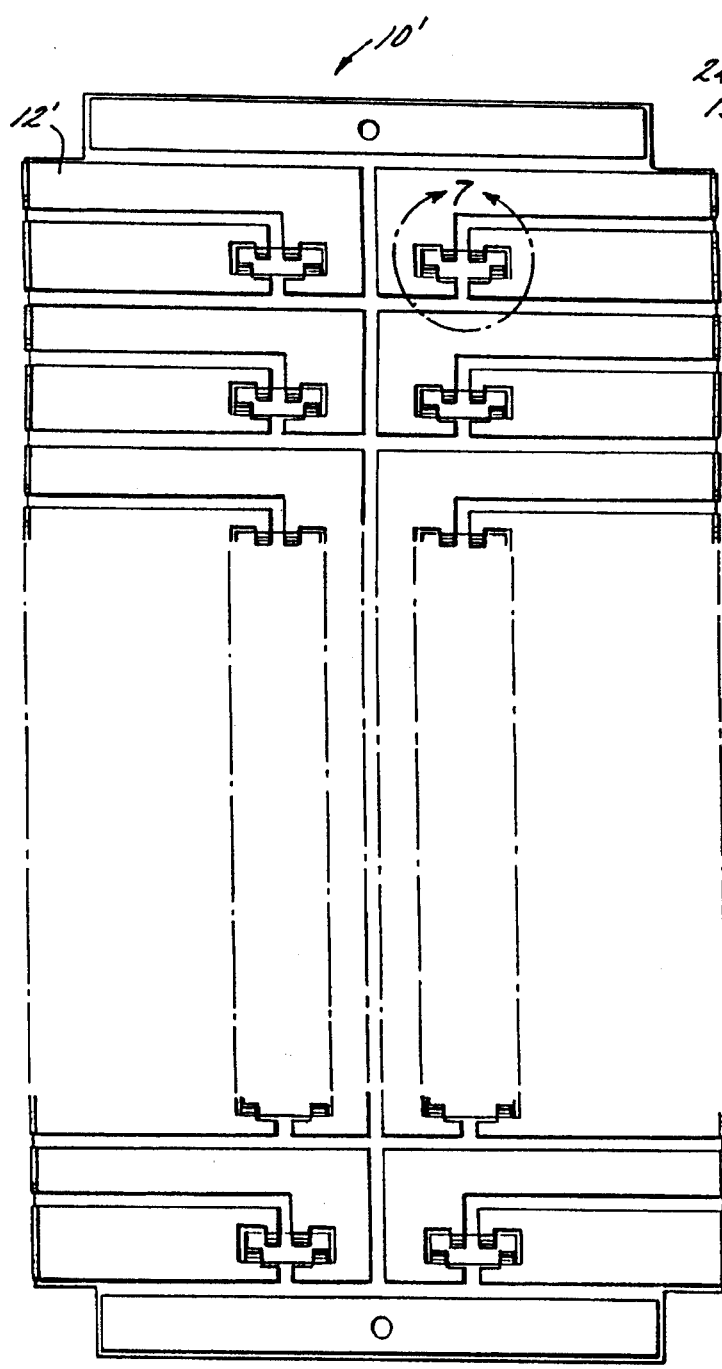
FIG. 6 is a plan view of an alternate embodiment of the planar fuse panel of the present invention.

A preferred embodiment of the planar fuse panel in accordance with the present invention is shown in plan view in FIG. 1. Referring jointly now to FIGS. 1–5, a preferred embodiment of the present invention is shown generally at 10. Planar fuse panel 10 comprises an electrical bus member or terminal plate 12. Terminal plate 12 is composed of a resilient metal such as copper or brass in thicknesses suitable to carry the intended electrical load. Electrical bus member 12 is sandwiched between two layers of insulation 30 and 32, preferably applied by heat and pressure in a lamination process. Bus member 12 has stamped therein a multitude of discrete, spaced planar circuits with each circuit preferably having an overall rectangular configuration. In the FIG. 1 embodiment, each discrete circuit comprises a first element having an "L" shape and a second rectangularly shaped element 15 disposed adjacent to, but spaced from the shoulder or step 14 in "L" shaped element 13, with a corresponding "L" shaped gap 16 thus being defined between elements 13 and 15. Each discrete circuit (composed of elements 13 and 15) are spaced from each other by a border 19 defined by insulative film 30, 32.

Electrical bus member 12 has a plurality of rectangular spaces 17 with a single space 17 being disposed between pairs of elements 13 and 15 and across gap 16. Each space 17 includes a plurality of fuse terminal members 18 extending into space 17. Each terminal member 18 terminates at an integral fuse terminal 22 and 23. Integral fuse terminal or bent tab 22 extending from element 15 consists of three pressure tabs 22a, 22b and 22c. Fuse terminal 22 is aligned and spaced apart from a corresponding fuse terminal 23 on element 13 which also consists of three pressure tabs 24a, 24b and 24c. In the particular embodiment illustrated in the drawings, the fuse terminals 22 and 24 are pressure clip terminals comprising bent tabs which are adapted to accept and frictionally engage and retain the generally flat blade portions of a plug-in fuse. Accordingly, tabs 22b and 22c are spaced from tab 22a to define a slit having a width slightly less than the width of a blade-type terminal. Similarly, tabs 24b and 24c are spaced from tab 24a in a similar manner. It will be appreciated that tabs 22b and 22c are coplanar and opposed from, but offset to, tab 22a. Similarly, tabs 24b and 24c are coplanar and opposed from, but offset to, tab 24a. The electrical bus member 12, in this particular embodiment, is adapted to be connected to any power source or load by means of a multiplicity of electrical terminals 20 which are standard spade quick-connect terminals extending from each element 13, 15 either in coplanar relationship or at an angle to terminal plate 12. Terminals 20 are mutually aligned and arranged on opposed, longitudinal edges of substantially rectangular planar sheet 12. Insulation layers 30 and 32 can be made from polyester or polyamide (or any other suitable material), both of which are flame retardant.

Referring now to FIG. 3 which is a cross-sectional elevation view of the planar fuse panel of FIG. 2 along the line 3—3 of FIG. 2. The low profile of the planar fuse panel is clearly shown. A blade-type fuse 26 (in phantom) is shown inserted between two (22a and 22c) of the three tabs frictionally engaging and retaining one blade 29 of the blade-type fuse. It will be appreciated that the resilient nature of tabs 22, 24 permit blade 29 to deflect the tabs outwardly and allow a strong frictional engagement. In this cross-section, it is seen how electrical bus member 12 is sandwiched between layers of insulation 30 and 32. FIG. 4 is a similar cross-sectional elevation view along the line 4—4 of FIG. 2. Retaining tabs 24a and 24b are shown for retaining the second blade of the blade-type fuse. Again, the unique sandwiching of electrical bus member 12 between insulation layers 30 and 32 is clearly shown.

FIG. 5, which is a partial elevated side view of the planar fuse panel of FIG. 1 shows two of the electrical terminals 20 and their relationship to the fuse terminals 18 via the electrical bus members 12. In this case, terminals 20 are bent at an angle of 90 degrees with respect to plate 12. At opposed ends of fuse panel 10, adjacent bus member 12, are extension tabs 34 and 36 with each extension tab containing an opening 38, 40, respectively. Extension tabs 34, 36 are coplanar with fuse plane 12 and are stamped out simultaneously with the initial stamping operation. Tabs 34 and 36 are similarly laminated between the two non-conductive films 30, 32. Extension tabs 34 and 36 together with openings 38, 40 are for the purpose of mounting fuse panel 10. It will be appreciated that in a preferred embodiment, insulative film 30, 32 fully encapsulates planar sheet 12 with the exception of terminals 20, space 17 and bent tabs 22, 24.

Figure 7:
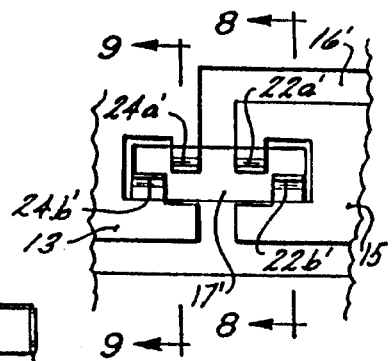
FIG. 7 is an enlarged detailed plan view of the area encircled as 7 in FIG. 1.
Figure 8:
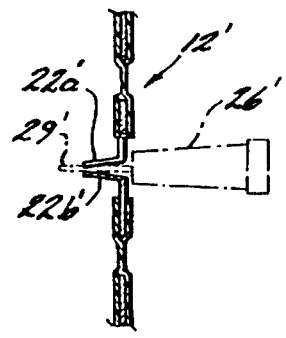
FIG. 8 is a cross-sectional elevation view of the planar fuse panel of FIG. 7 along the line 8—8 of FIG. 7.
Figure 9:
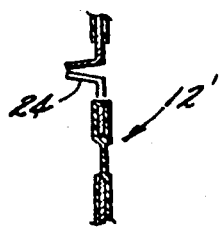
FIG. 9 is a cross-sectional elevation view of the planar fuse panel of FIG. 7 along the lines 9—9 of FIG. 7.
Figure 10:
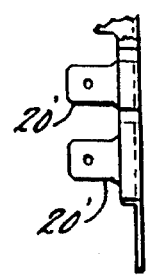
FIG. 10 is a partial elevated side view of the planar fuse panel of FIG. 6.
Figure 11:
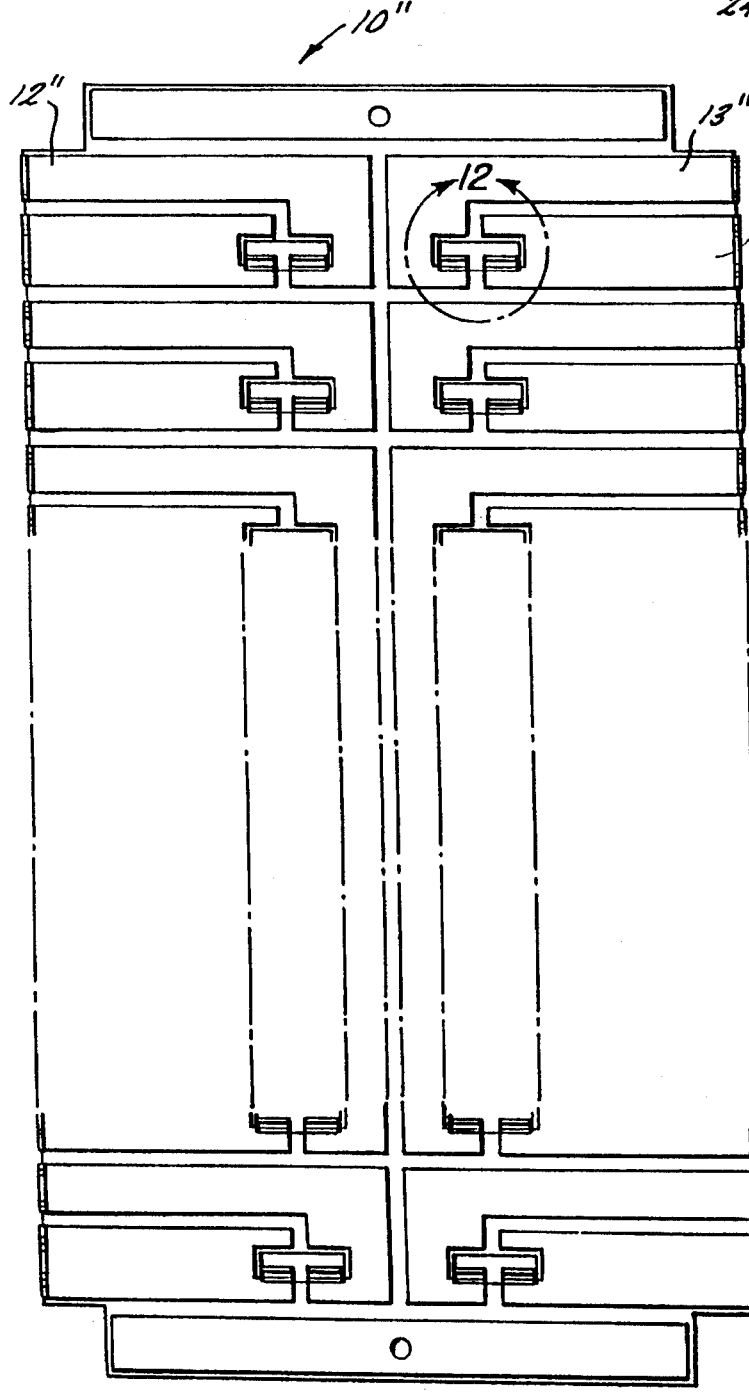
FIG. 11 is a plan view of still another alternate embodiment of the planar fuse panel of the present invention.
Figure 12:
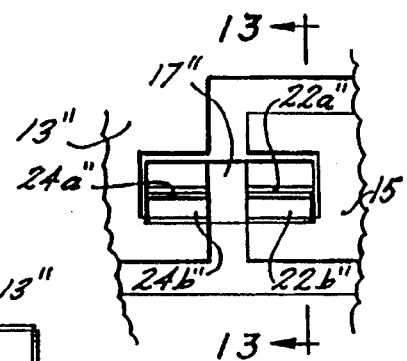
FIG. 12 is an enlarged detailed plan view of the area encircled as 12 in FIG. 11.

Turning now to FIGS. 6–10, an alternative embodiment of the present invention is shown generally at 10'. It will be appreciated that in this alternative embodiment of FIGS. 6–10 (as well as a second alternative embodiment in FIGS. 11–14), all of the common elements would be marked with the same numbers as in the FIG. 1 embodiment with the addition of a prime or double prime. The FIGS. 6–10 embodiment differs from the FIG. 1 embodiment only in the configuration of the tabs 22', 24' for frictionally engaging a blade 29' from a fuse 26. As best shown in FIG. 7, rather than each connective element 13 and 15 of a particular circuit comprising three tabs for a total of six tabs, in the embodiment of FIG. 6, each element 13', 15' includes only two tabs for a total of four engaging tabs. In the FIG. 6 embodiment, element 15 includes a pair of spaced tabs 22a' and 22b' while element 15 includes a pair of spaced tabs 24a', 24b'. Tabs 22a', 22b', on the one hand, and tabs 24a', 24b' on the other hand are disposed and off-set from one another again to define a slot having a width which is slightly less than the width of a blade 29' so that the tabs are resiliently deformed upon insertion of the blade and then urged together to form a tight friction fit.

Figure 13:
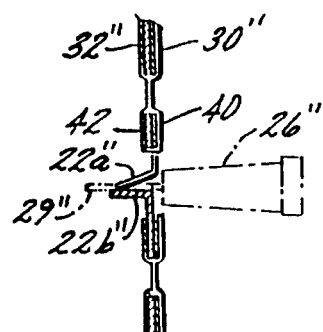
FIG. 13 is a cross-sectional elevation view of the planar fuse panel of FIG. 12 along the line 13—13 of FIG. 12.
Figure 14:
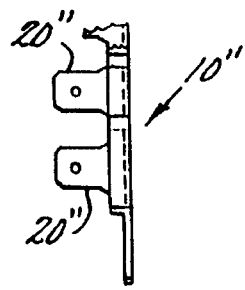
FIG. 14 is a partial elevated side view of the planar fuse panel of FIG. 11.

Turning now to the alternative embodiment of FIGS. 11–14, a planar fuseplate is shown at 10. In the alternative embodiment of FIG. 11, each element 13" and 15" of a particular circuit is comprised of two metal layers 40 and 42 as best shown in FIG. 13. In this embodiment, the space 17" includes a total of four tabs 22, 24 with element 15" having a tab 22a" and 22b" and element 13" having two tabs 24a" and 24b". Preferably, metal layer 32 is slightly thicker than metal layer 40 and the tabs 22a" and 24a" extending from metal layers 40 are angled towards and normally in contact with bent tabs 22b" and 24b" as shown in FIG. 13. In this two metal layer embodiment, metal layer 42 is intended to carry the current while metal layer 40 supplies the spring force to normally contact layer 40 prior to insertion of a blade 29" from fuse 26". Metal layers 40 and 42 are both sandwiched between nonconductive polymeric films 30" and 32" as in the previously discussed embodiments.

It will be appreciated that fuse holder 10 may also be used as a power and signal plane to carry electrical signals and/or power, in addition to holding fuses.

A further embodiment which is within the ambit of the invention, and illustrated in FIGS. 15–18, is a fuse plane 60 which uses blade-type terminals 50, as opposed to cooperating bent tabs, for engaging a fuse or the like to complete a circuit. This embodiment uses a molding material (a filled or unfilled thermoset or thermoplastic) 55 (shown only in FIGS. 16 and 18) to insulate the fuse plane 60. One of skill in the art will appreciate that to use molding material on the fuse plane with bent tabs (of FIGS. 1–14) would be a very expensive proposition due to the intricate molding processes and numerous molds which would be required. However, it will also be appreciated that such molding material does provide good insulation and is useful in making a fuseplane stiff for plug-in operation. The present inventors have discovered that a fuseplane of the type described can be produced having the benefit of encasement in a molding material yet without multiple molds. Blade-type connections 50 can be used instead of the spaces 17 and bent tabs 22 and 24 utilized in the embodiment discussed above, such that the blades 50 can extend through the plastic resin, thus being exposed for connection. This relieves the need to provide open spaces in the molded plastic which simplifies the molding process. The exposed blades can then be connected to a fuse or similar circuit connecting device.

For each operable unit of tabs, i.e., 22a, 22b and 22c; or 24a, 24b and 24c, a single blade terminal 50 is utilized. Therefore, where, in the embodiment above, either a six tab arrangement or a four tab arrangement is used, two blade terminals will be used instead, one terminal for each element 51 and 52 of the circuit. The blade terminals 50 are long enough to extend through the plastic molded covering material so that they are exposed. The exposed blade terminals can be connected in a number of known ways, whether the connection be to a fuse for completing a discrete circuit or by plugging the fuse plane into another device to function simultaneously therewith.

Although one of skill in the art will appreciate that any configuration of elements can be used, the embodiment described in FIG. 15 utilizes a single element 52 as a collective ground or positive terminal with a plurality of connective elements 51–51'''. Space is economized in the arrangement.

The fuseplane element of FIGS. 15–18 is made by placing the stamped, metal sheet elements in a mold followed by injecting a suitable polymeric molding material. The stamped, metal sheet may be placed in the mold and retained in spaced relationship therein by suitable retainers. However, in a preferred embodiment, the stamped, metal sheet is initially encapsulated between two sheets of protective polymeric film by a suitable lamination technique as described with reference to FIGS. 1–14. By employing an intermediate step of first laminating each fuseplane between nonconductive films prior to molding a molding material to surround the fuseplane, the sometimes difficult and costly steps of retaining the stamped, metal sheet in the mold is alleviated. FIG. 16A depicts this preferred configuration wherein element 60 has been initially laminated between a pair of polymeric films 80, 82 (as in the FIGS. 1–14 embodiments) prior to insertion in a mold and embedded in molding material 55.

Another embodiment of the invention, which has been made effective by the use of blade terminals, is the multilayer fuseplane. This embodiment is illustrated in FIGS. 19 through 21B. The fuseplane utilizes the same basic concept as the single layer fuseplane above in that discrete circuits are formed from a metal blank and then laminated between two sheets of insulative material either individually or in a stack-up where one or more fuse planes are stacked having interleaved layers of insulation. In this embodiment, however, the configuration of the elements is such that terminals 50–50' from layers above and below the subject layer can extend therethrough. Moreover, in this embodiment there are no bent tabs; only blade terminals 50–50' are used. The blade terminals used are of different lengths for each level of the multilayer fuseplane, numeral 50 representing a standard length and 50' representing an extended length sufficient to pass through another fuseplane. This is necessary to ensure that all of the exposed blade terminals extending either from the top of the assembled multilayer fuseplane or from the bottom of the same will be exposed for substantially the same length. This promotes uniformity and ease of connection.

Multiple layer fuseplanes are beneficial to the electronics and electrical packaging industry because they are capable of comparatively higher current densities and/or larger number of circuits than a single layer fuseplane. The reason for this is that the more current that is required to be carried by the circuit the more metal is necessary to carry that load. Therefore, if a single layer fuseplane is used, only a limited number of circuits could be employed due to space constraints. However, where the multiple layer fuseplane is employed, a larger number of circuits can be employed in only a minimally expanded area.

Multilayer fuseplanes must be constructed to nest with one another so that blade terminals extending from one layer are not impacted by another layer. To accomplish this end it is necessary to provide holes or openings in fuseplanes above or below a subject fuseplane so that the terminals on the subject fuseplane can extend through the layers on top or below it.

Figure 19A:
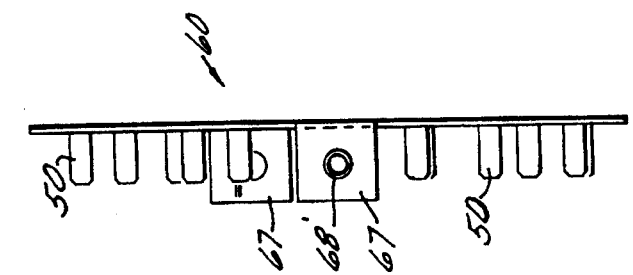
FIG. 19A is an end view of FIG. 19.
Figure 19:
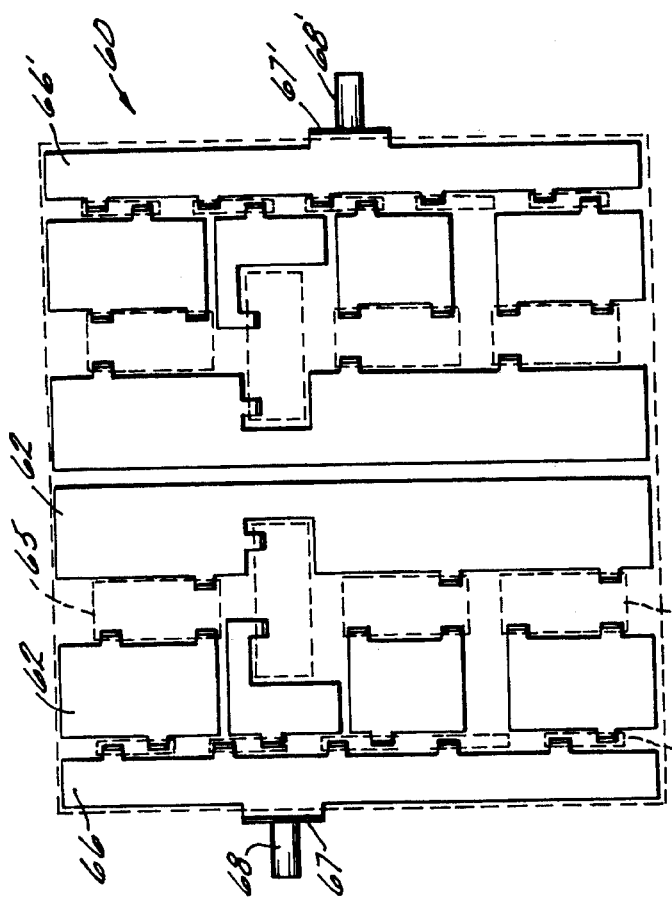
FIG. 19 is a plan view of the top layer of a multilayer fuseplane of the invention.
Figure 19B:
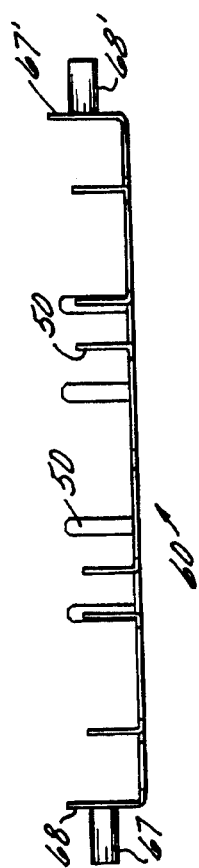
FIG. 19B is a side view of FIG. 19.

By referring to FIG. 19–21B in view of the description above, one can easily surmise the construction of the invention. FIGS. 19, 19A and 19B show a top view, an end and a side view of the top layer 60 of a preferred embodiment. As will be appreciated, the top view of FIG. 19 shows elements 62 having various shapes and spaces 65 which are left for the extending blade terminals. The bottom layer 60' is illustrated in FIG. 20, 20A and 20B has elements 62' and spaces 65' complementary to each of the other layers. Each of these figures also illustrate the blade terminals 50, 50' on each of the elements. The two opposing edges 66, 66' of layer 60 each includes a transverse connecting tab 67, 67" with a male member 68, 68' extending transversely from each respective tab 67, 67'.

Figure 21A:
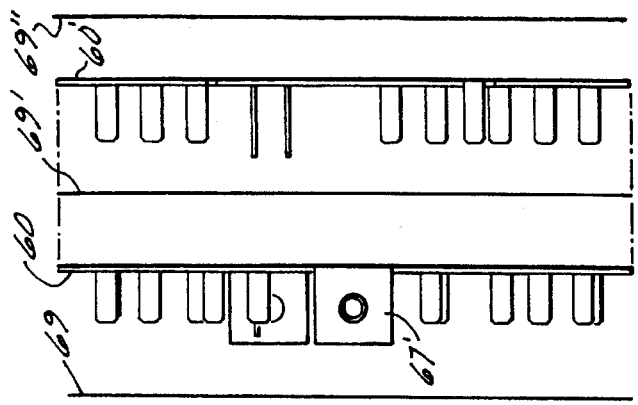
FIG. 21A is an exploded end view of FIG. 21.
Figure 21:
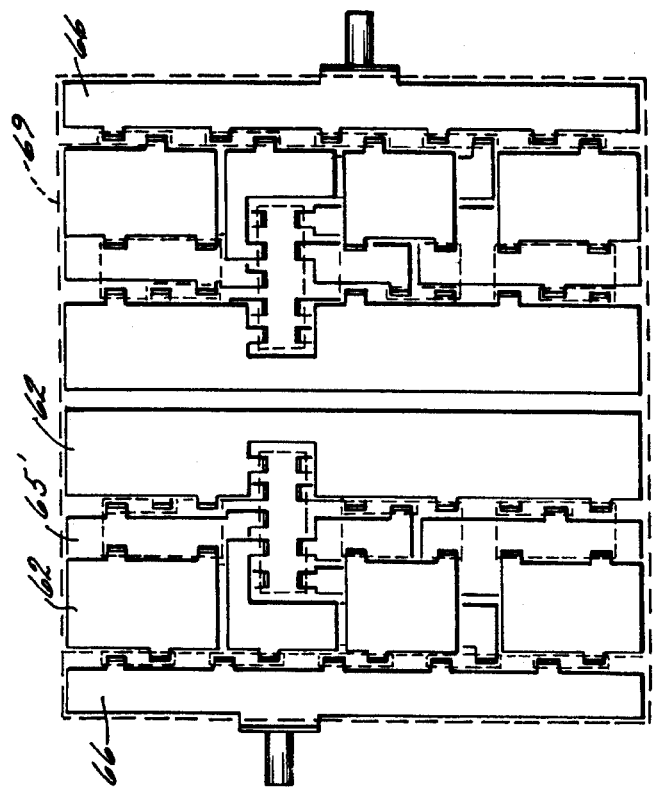
FIG. 21 is a plan view of the multilayer fuseplane in assembled form.
Figure 21B:
FIG. 21B is a side view of FIG. 21.

FIGS. 21, 21A and 21B illustrate the two layers of FIGS. 19 and 20, in their assembled form. During assembly, layers of nonconductive insulative materials 59, 69' and 69" are interleaved over and between metal layers 60, 60' so as to sandwich and encapsulate each conductive layer 60, 60' between a pair of nonconductive insulative films 69, 69' or 69', 69".

As one of skill in the art will appreciate, the multilayer fuseplane can be constructed using two (or any other desired number of layers) individual layers which have been punched from a suitable metal and individually laminated, and then stacked. This is the method as illustrated in FIGS. 1–14. Alternatively, the punched metal elements can be maintained in spaced relationship to one another by a suitable device (or more preferably laminated between two layers of polymeric film) and then plastic resin pumped in to surround, insulate and encapsulate the layers of metal elements. This method is shown in FIGS. 15–18.

The multiple layer fuseplane can then be connected in the same manner as discussed relative to the embodiment immediately preceding. The invention also provides the opportunity to accommodate a variety of terminals such as female-to-female connectors, fasten tabs, etc.

Of course, any one of the individual fuseplanes of FIGS. 19 or 20 may be made as a single fuseplane (as opposed to being combined in a multiple fuseplane) device. The important common feature is the use of blade-type terminals extending outwardly from each circuit element along the edges of the fuseplane and/or from openings made internally of the fuseplane with the blades preferably extending angularly from the fuseplane (most preferably at an angle of about 90 degrees) and with the blades accepting a variety of I/O configurations.

The blade-type terminals extending from the fuseplane embodiments of FIGS. 15–21 may be connected to an intermediate connector which, in turn, is connected to a blade-type components such as item 26 in FIGS. 3. In this way, the blade extending from the fuseplane is indirectly electrically connected to the blade from component 26 via the intermediate connector. Alternatively, and in a preferred embodiment, connecting means are provided which directly electrically and mechanically connect the blade from a fuseplane to the blade from a component (such as fuse 26). An example of such a direct attachment means is a discrete clip connector such as the spring clip 70 in FIGS. 21–24.

Figure 24:
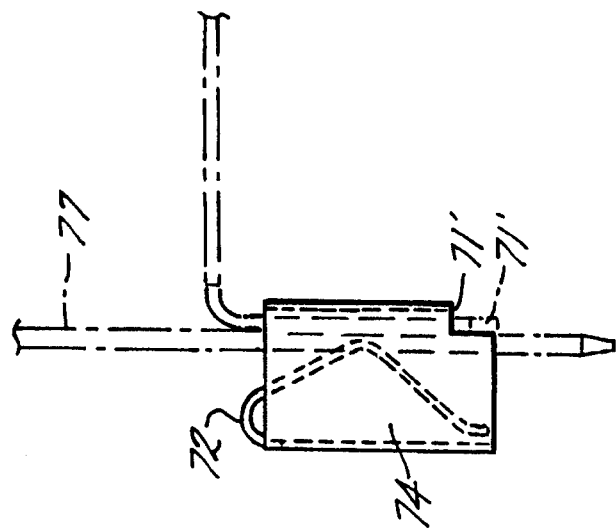
FIG. 24 is a side view of FIG. 24.
Figure 23:
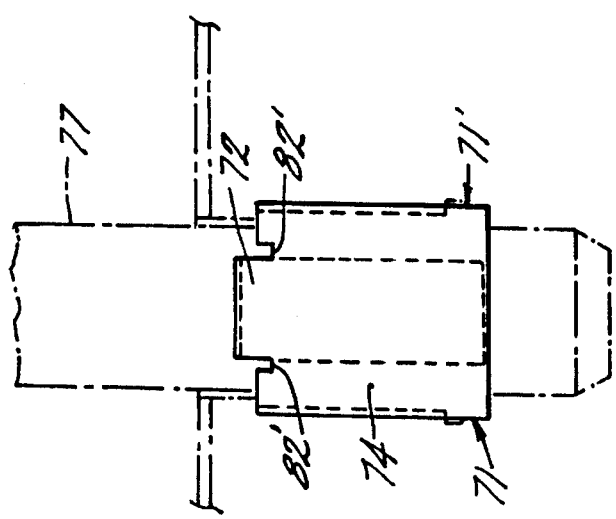
FIG. 23 is a plan view of the spring clip in an engaged position.
Figure 22:
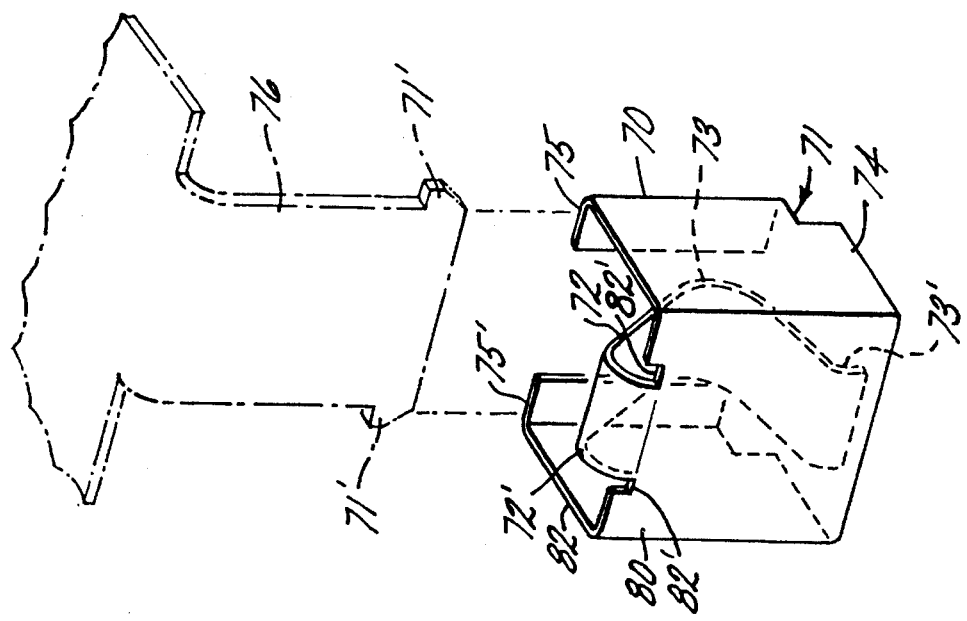
FIG. 22 is a perspective view of a spring clip of the invention.

Spring clip 70 operates to provide a frictional engagement device for holding electrically conductive elements when opposing bent tabs are not provided. Spring clip 70 thus provides direct electrical and mechanical engagement between the blades of the fuseplane and of a blade-type component. As illustrated in FIGS. 22, 23 and 24 collectively, the spring clip 70 comprises a unitary construction having a resilient spring means 72 and a frame portion 74 which is in a channel shape including flanges 75 and 75' extending from each side of the channel toward each other. It should be noted that the flanges are the preferred embodiment but that a continuous wall could replace the flanges if desired. Generally, from the channel end of the frame 74, a resilient spring means 72 extends toward the flanges 75 and 75'. The spring means can be any type of resilient configuration and simply must be capable of urging one conductive blade terminal 77 (extending outwardly from any of the fuseplanes shown in FIGS. 15–21) into electrical and mechanical communication with another terminal 76 (shown in phantom) which is secured by the flanges 75 and 75' of the frame portion 74 of the spring clip 70. In the preferred embodiment, the spring means 72 is a bent member which extends from a back portion 80 of frame 74. The spring means 72 is formed from a vertically extending length of the metal which forms the channel. The spring in the preferred embodiment is bent in three distinct places along its length at 72', 73 and 73'. Bend 72' is an increasing radius bend which bend begins at about the level of the top end 82, and above cutouts 82', of frame 74. The length of metal then extends straight at approximately 35° to the back wall 80 of the frame for a suitable distance where at 73, the length of metal bends again back toward the back of the frame 74 and away from the flanges 75 and 75'. The length of metal which will be the spring means 72 then continues toward the back wall 80 of the frame 74 at an angle of approximately 35° thereto and terminates in close proximity to the back wall 80 of the frame 74 with a bend 73' which turns the spring means to an attitude parallel to the back wall 80. In the most preferred embodiment, flanges 75 and 75' extend only partially along frame 74. A gap 71 is defined which communicates with barbs 71'. This ensures that the spring clip remains secured in the desired position when subjected to the pressure of an entering blade terminal 77 so that a reliable electrical connection is achieved.

The spring clip 70 can be made from any resilient material including but not limited to metal and plastic. It is not necessary for the clip to be conductive; it merely urges two parts, which are conductive, together.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A fuse panel comprising:

a first assembly including;
  (a) a planar resilient metal sheet means having a plurality of discrete, spaced planar circuits formed therein, each circuit comprising a first element having a first shape and a second element having a second shape, said first element being spaced from said second element by an insulative gap;
  (b) first resilient blade means extending from said first element and extending outwardly from said sheet means;
  (c) second resilient blade means extending from said second element and extending outwardly from said sheet means; and
  (d) a dielectric protective layer surrounding and in direct contact with said planar sheet means with the exception of at least a portion of said first and second blade means.

2. The fuse panel of claim 1 wherein:
said dielectric protective layer comprises insulative film laminated to opposed planar surfaces of said sheet means.

3. The fuse panel of claim 1 including:
at least one internal space formed at a predetermined location through said sheet means, at least one of said first or second blade means extending outwardly from said space.

4. The fuse panel of claim 1 wherein:
said first or second blade means extends outwardly from an edge of said sheet means.

5. The fuse panel of claim 1 wherein:
at least one of said first or second blade means extending outwardly and angularly from said sheet means.

6. The fuse panel of claim 1 further including:
a molding material encapsulating said first assembly with the exception of at least a portion of said first and second blade means.

7. The fuse panel of claim 1 including:
a plurality of said assemblies arranged in a stack-up to define a multilayer circuit sheet.

8. The fuse panel of claim 1 including:
discrete connector means on said first or second blade means for providing direct electrical and mechanical connection to a blade-type component.

9. The fuse panel of claim 8 wherein:
said discrete connector means comprises a spring clip.

10. The fuse panel of claim 9 wherein said spring clip comprises:
a frame means adapted to engage one of said blade means such that a spring means, disposed within the frame means, extends toward the blade means, said spring means terminating substantially adjacent the blade means, whereby a discrete blade terminal is frictionally engageable between the spring means and the blade means.

11. The fuse panel of claim 10 wherein:
the frame means comprises a channel with flanges extending from each side of the channel toward a center of the channel.

12. The fuse panel of claim 10 wherein:
the spring means comprises an integral part of the frame means.

13. The fuse panel of claim 10 wherein:
the spring means is resilient metal and is bent from a blank to form the spring clip.

14. The fuse panel of claim 10 wherein:
the flanges extend only partially along the length of the frame to define openings which are engageable with at least one barb on the blade means to positively engage said spring clip with the blade means.

* * * * *